United States Patent
Kubo et al.

(10) Patent No.: US 6,313,879 B1
(45) Date of Patent: Nov. 6, 2001

(54) SYNCHRONIZATION METHOD AND DECODER

(75) Inventors: Hiroaki Kubo, Ohmihachiman; Noriaki Asamoto, Kusatsu, both of (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/151,572

(22) Filed: Sep. 11, 1998

(30) Foreign Application Priority Data

Oct. 9, 1997 (JP) .................................................. 9-276789

(51) Int. Cl.[7] .............................. H04N 5/06; H04N 5/073
(52) U.S. Cl. ........................ 348/512; 348/500; 348/515; 348/537; 348/423.1; 348/425.4; 375/327; 375/240.28; 375/376
(58) Field of Search ................................. 348/518, 500, 348/512, 515, 516, 524, 537, 423.1, 425.4; 375/293, 294, 327, 376, 240.28, 373, 364, 365, 366; 386/71, 84, 119; H04N 5/06, 5/073

(56) References Cited

U.S. PATENT DOCUMENTS

| | | | |
|---|---|---|---|
| 5,559,999 | * 9/1996 | Maturi et al. | 395/550 |
| 5,771,075 | * 6/1998 | Rim et al. | 348/512 |
| 5,812,201 | * 9/1998 | Yoo | 348/423 |
| 5,818,539 | * 10/1998 | Naimpally et al. | 348/512 |
| 5,960,006 | * 9/1999 | Maturi et al. | 348/512 |
| 6,088,063 | * 7/2000 | Shiba | 348/515 |
| 6,088,357 | * 7/2000 | Anderson et al. | 370/392 |
| 6,101,591 | * 8/2000 | Foster et al. | 348/423 |
| 6,118,486 | * 9/2000 | Reitmeier | 348/441 |
| 6,148,135 | * 11/2000 | Suzuki | 348/512 |
| 6,151,479 | * 11/2000 | Kummer | 348/521 |

* cited by examiner

*Primary Examiner*—Michael Lee
*Assistant Examiner*—Jean W. Désir
(74) *Attorney, Agent, or Firm*—Ohlandt, Greeley, Ruggiero & Perle, LLP; Daniel P. Morris, Esq

(57) ABSTRACT

When short MPEG2 data transfer streams, such as those used for commercials, are sequentially distributed within a short period of time, a decoder method synchronizes the transfer and prevents accumulation of data in a buffer and data losses. The synchronization method extracts sync data originating at the transmission source from a received data stream; acquires sync data for a decoder based on a reference clock; compares the sync data originating at the transmission source with the sync data for the decoder in order to sequentially obtain control values, sequentially updates the frequency of the reference clock for transfer synchronization for the received data stream; determines whether or not a data stream that differs from the received data stream has been received; and employs, when a different data stream has been received, the reference clock obtained when the received data stream has been received, to initiate transfer synchronization for the different data stream.

2 Claims, 2 Drawing Sheets

SYNCHRONIZATION METHOD AND DECODER

FIELD OF THE INVENTION

The present invention relates to a synchronization method for a data stream and a decoder, and in particular, to a synchronization method for an MPEG (Moving Picture Experts Group) encoded data stream.

BACKGROUND OF THE INVENTION

MPEG is a digital data transfer standard, and is well known as a standard for digital compression of video signals and audio signals. An MPEG2 data stream of digitally compressed video signals and audio signals is distributed across a network. A decoder at a reception location receives the data stream and reproduces video and audio signals. The speed at which a data stream is distributed across a network must be high because a large amount of data for video signals and audio signals are transmitted.

A transmission speed of about 750 kbytes per second is required in order to attain the high resolution and picture quality needed for the general TV broadcasting. In this situation, bidirectional communication is not easy because of the transfer speed involved. Thus, the transfer of data by CATV and broadcast satellites is effected by employing unidirectional communication within a band area in which the data are to be transmitted. For an adequate exchange of data when employing unidirectional data distribution, sync data called program clock reference (hereinafter referred to as "PCR") is included in the MPEG2 data stream emitted by the transmission source. The decoder extracts the PCR sync signal from the received data stream to obtain the sync data originating at the transmission source. The PCR is time data that is loaded during the encoding of data, and is processed at the transmission source during the transmission.

The decoder includes a system time clock (hereinafter referred to as an "STC"), which is sync data available at the decoder, and which is generated based on a reference clock when decoding is performed by the decoder. The decoder detects the PCR in the received data stream, and compares the detected PCR with its internal sync data STC. It is possible from the difference between the two to identify the degree of transfer shift for the reference clocks between the transmission side an d the reception side. If the sync data differ, it means that the transfer speeds identified by the transmission source and the reception location differ. When there is a difference in their identified speeds, a data overflow may occur at the decoder, or reproduced data may be cut off. Thus, the decoder updates the STC and synchronizes it with the PCR data to acquire a reference clock having a frequency for which synchronization for transfer can be acquired.

A PLL (Phase Locked Loop) structure, including a voltage control oscillator, is employed as a circuit for acquiring such synchronization. The voltage control oscillator can vary an output frequency (clock) in accordance with a received voltage. A first PCR extracted from a specific data stream is set to a counter, and the value held by the counter is sequentially incremented in accordance with a change in the pulse, which is the output (i.e., the reference clock) of the voltage control oscillator. That is, the value currently set in the counter is the current sync data STC of the decoder. The STC is compared by the feedback control with the PCR extracted from the received data stream. A control voltage that corresponds to the difference between the data is supplied to the oscillator, thereby updating the frequency of the reference clock in the decoder. When the STC matches the PCR, i.e., is in the locked state, the control of the oscillator is stabilized. Such a control sequence is called a clock recovery operation.

If a plurality of short data streams are sequentially distributed in a short period of time, the next new data stream may be distributed before the control by the voltage control oscillator in the decoder is stabilized. In this case, the process whereby the STC is locked to the PCR must be repeated from the beginning by the decoder. For MPEG2, the frequency of the reference clock at the decoder is initially set to 27 MHz, for example, and is updated to an optimal value in accordance with the difference between the STC and the PCR. The frequency is stabilized when the STC and the PCR match. When distribution of a new data stream is detected, the frequency of the reference clock at the decoder is reset to the initial value of 27 MHz, and its updating begins again at this value. If the reference clock of the transmission source has a higher frequency than that at the decoder, received data are accumulated in a buffer at the decoder during a period that continues until the control of the oscillator is stabilized. As a worst case, the quantity of data may increase until it exceeds the buffer capacity, resulting in the loss of data.

Such a case may occur in commercial base broadcasting. For example, when a data stream is distributed wherein the same advertisement is inserted into it many times, and the stream for a single commercial is employed a number of times. In this case, each time distribution of the commercial data stream is made, the PCR is reset and returns to zero.

In accordance with the MPEG standards, 10 or more transfers per second are required for the sync data PCR originating at the transmission source. Accordingly, the decoder must compare the STC with the PCR at least 10 times per second. Since generally for the dispersion feedback control about 20 to 100 samples are required before stabilization is realized (under servo), a period will be needed of around two seconds, at least, from the start of the control process until the locked state is attained. Therefore, when another data stream is distributed in a shorter period of time, the above described problems would occur.

It is believed that the distribution of the MPEG2 transfer stream will become primary in the commercial base. It is probable that short data streams, such as those for commercials, may be sequentially distributed in a short period of time.

It is, therefore, one object of the present invention to provide a method for smoothly acquiring synchronization, even when short data streams are received in a short period of time.

It is another object of the present invention to prevent, to the extent possible, the accumulation of data in the buffer of a decoder, even when short data streams are sequentially received.

It is an additional object of the present invention to prevent the occurrence of data loss during data reproduction.

SUMMARY OF THE INVENTION

To achieve the above objects, according to a first aspect of the present invention, a synchronization method is provided for acquiring synchronization for a data transfer that is effected between a transmission source and a decoder, when an encoded data stream, including sync data originating at the transmission source, is distributed across a network to the decoder. The decoder comprises an oscillator for varying a frequency for a produced reference clock in accordance with a control value and which decodes data by using the reference clock as a reference. The synchronization method includes the steps of: extracting the sync data originating at the transmission source from a received data stream; acquiring sync data for the decoder based on the reference clock; comparing the sync data originating at the transmission source with the sync data for the decoder in order to sequentially obtain the control values, and sequentially updating the frequency of the reference clock for transfer synchronization for the received data stream; determining whether or not a data stream that differs from the received data stream is received; and employing, when a different data stream is received, the reference clock obtained when the received data stream has been received to initiate transfer synchronization for the different data stream.

When a predetermined limit value is set and when a difference between the extracted sync data originating at the transmission source differs from the sync data for the decoder, it can be ascertained that a different data stream has been received.

The above method may further include a step of, when it is ascertained that a different data stream has been received, setting as an initial value for sync data for the decoder, sync data originating at the transmission source that is extracted from the different data stream.

According to a second aspect of the present invention, a decoder is provided comprising a feedback circuit including a comparator, a control value determination means, an oscillator and a counter for decoding an encoded data stream that is distributed across a network and that includes sync data originating at a transmission source. The decoder further comprises: an extraction circuit for extracting from a received data stream the sync data originating at the transmission source; an oscillator for generating a reference clock used to decode data and for varying the frequency of the reference clock in accordance with a control value; a counter for receiving the reference clock produced by the oscillator and for setting sync data for the decoder in accordance with the reference clock: a comparator for acquiring a difference between the sync data originating at the transmission source and the sync data at the decoder; control value determination means provided between the comparator and the oscillator for determining the control value in accordance with the acquired difference; and determination means for permitting, when the difference between the sync data originating at the transmission source and the sync data at the decoder is greater than a predetermined limit value, the control value determination means to employ a current reference clock to initiate new transfer synchronization.

According to the first and the second aspects, it is preferable that the data stream be an MPEG compatible data stream.

DETAILED DESCRIPTION OF THE INVENTION

So long as the data stream transmission source is the same, the frequency of a reference clock originating at the transmission source does not vary much, regardless of whether data streams differ. Thus, once a data transfer can be synchronized by the decoder, regardless of whether another data stream is received, a reference clock that is determined in advance is regarded as the initial value, and transfer synchronization for the other data stream is initiated. As a result, the continuity for the operational quantity handled by the voltage control oscillator is maintained.

Figure 1:
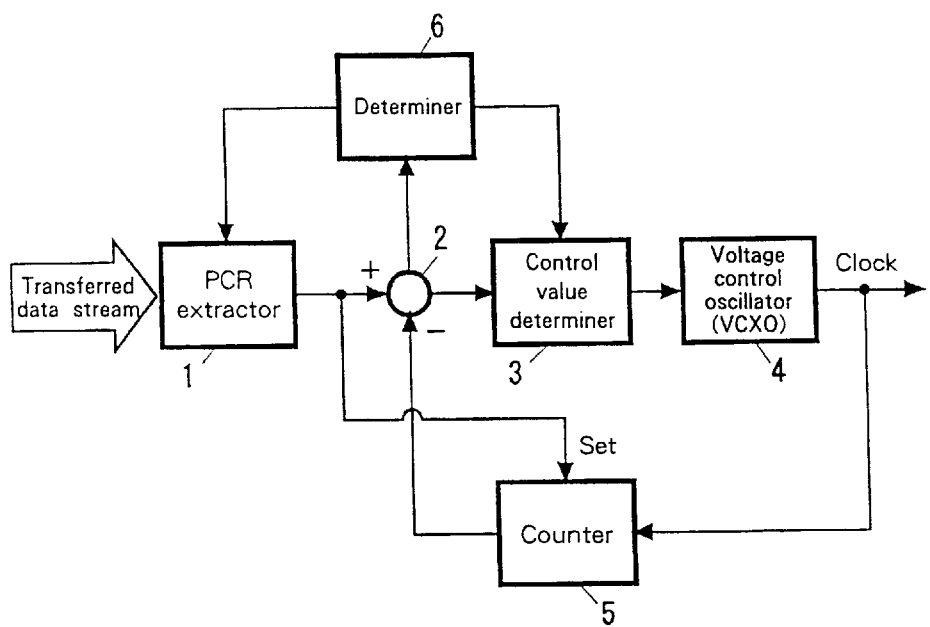
FIG. 1 is a block diagram illustrating the PLL structure in a decoder according to one embodiment of the present invention.

In FIG. 1 a block diagram illustrates the arrangement of a PLL circuit in a decoder. A PCR extractor 1, a comparator 2, a control value determiner 3, a voltage control oscillator 4, a counter 5 and a determiner 6 constitute a feedback circuit. With this structure, the decoder can acquire an STC that has the same frequency as that of a reference clock originating at a transmission source. The voltage control oscillator 4 is constituted by a crystal oscillator that can vary the oscillated frequency by using a control voltage (control value) called a VCXO (Voltage Controlled Crystal Reference). A frequency generated by the oscillator 4 is used as a reference clock to decode the MPEG2 data stream. According to the MPEG2 standard, the initial value of the reference clock is set to 27 MHz.

Figure 2:
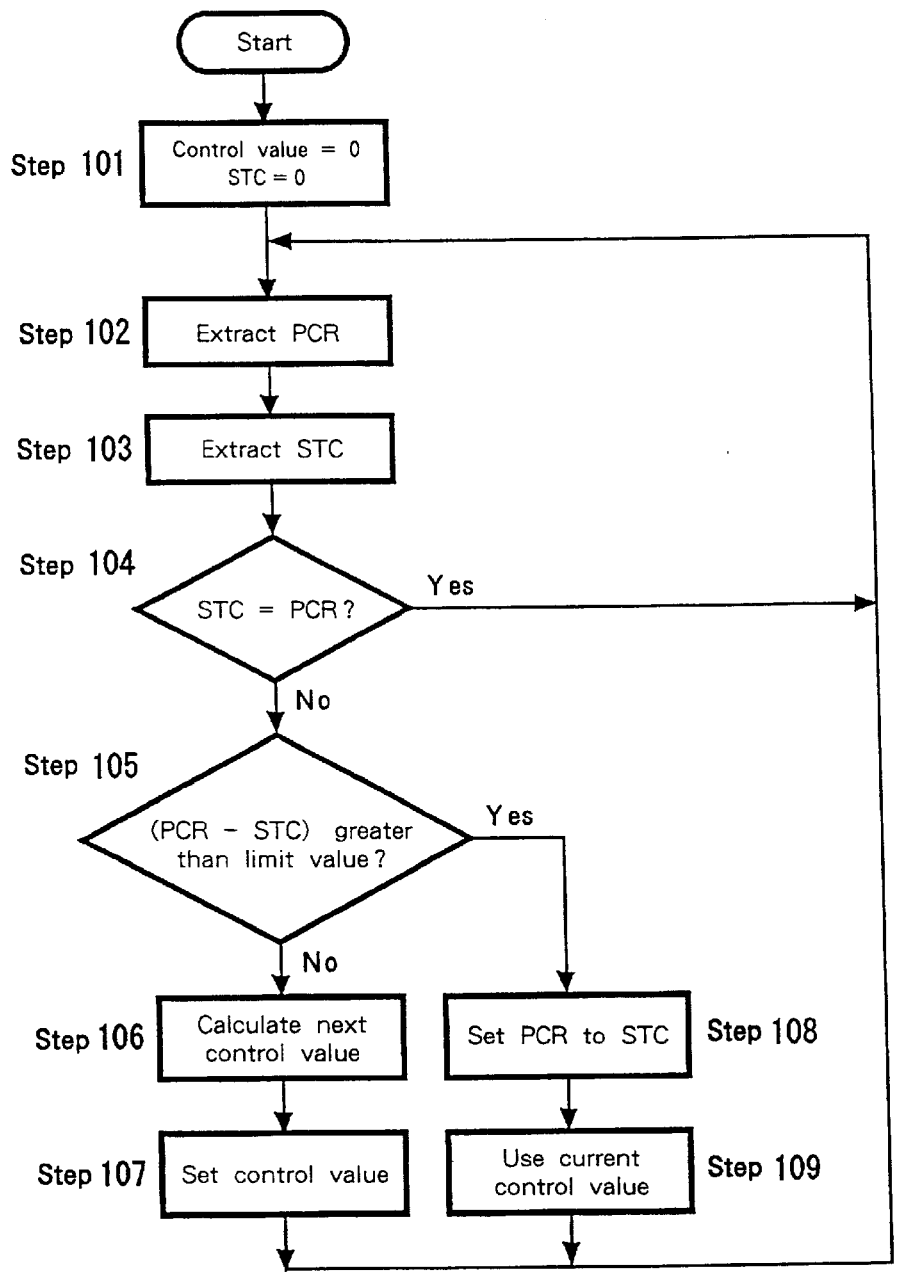
FIG. 2 is a flowchart showing a synchronization method according to the embodiment of the present invention.

FIG. 2 is a flowchart showing the synchronization method employed for the embodiment of the present invention. First, when the system is reset at step 101, the control value determiner 3 sets a control value=0, and sets STC=0 in the counter 5. Thus, the output of the voltage control oscillator 4 produces a reference clock having the frequency of 27 MHz, which was set initially.

At step 102, the PCR extractor 1 extracts the PCR (Program Clock Reference) from the MPEG2 data stream received across the network. The PCR is sync data originating at the transmission source, and is inserted in the MPEG2 data stream. The extracted PCR serves as information used by an MPEG decoder, including a video and audio decoder, to set or correct the decoder's STC value (reference sync data), which is a time reference, to the value that is established by the transmission source. As specified by the standard, transmission of PCRs occurs at least 10 times per second. Generally, a PCR is added when MPEG data are prepared (encoded), and before distribution to the decoder is effected, further processing of the PCR is performed by a server to prevent the generation of jitter during the transmission of the data.

At step 103, the STC is specified by referring to the counter 5. The STC is the sync data at the internal decoder, and is set by sequentially incrementing the value held by the counter 5 in accordance with changes in the pulse of the reference clock. The PCR and the STC are binary values of 40 bits each.

At step 104, a check is performed to determine whether or not the PCR, which the sync data originating at the transmission source that is extracted from the received data stream, matches the STC, which is the sync data at the decoder. This process is performed by the comparator 2 to acquire a difference between the PCR and the STC. When the two match, i.e., when the difference between the two is 0, it is assumed that the reference clock of the decoder equals the reference clock originating at the transmission source, and that the performance of the transfer has been synchronized. Program control then returns to step 102. As long as the STC and the PCR match, the processes at steps 102 to 104 are repeated.

When, at step 104, it is found that the STC and the PCR do not match, program control moves to step 105. That is, a check is performed to determine whether or not the difference between the PCR and the STC obtained by the comparator 2 is greater than a predetermined limit value. This determination process is performed by the determiner 6. by the comparator 2 is greater than a predetermined The determiner 6 determines whether or not a data stream that differs from a previous data stream has been received. More specifically, for this determination an adequate predetermined limit value is set in the determiner 6 and a difference between the PCR and the STC is compared with the limit value. When the new data stream is the same as the previous stream, the difference between the STC set in the counter 5 and the PCR extracted by the extractor 1 is not very large. However, when a differing data stream is received, the difference becomes greater. As a result, a limit value of 54000 (27 MHz×2 ms) pulses is set, and when the difference between the STC and the PCR is equal to or smaller than the limit value, it is assumed that a same data stream, that is, the same as the previous stream, has been received.

When the data stream is the same, program control advances to steps 106 and 107. Specifically, in accordance with the difference obtained by the comparator 2, the control value determiner 3 calculates a control value to be supplied to the voltage control oscillator 4, and determines a frequency for the updating of a reference clock. In this process, a current control value is multiplied by a feedback gain (a change in the frequency of the reference value when the control value is changed by one), and the offset value of this feedback is added to the result to obtain the next value for a change. When the value for a change exceeds a value for a change that was determined in advance, the limit value is used as the change value. This change value (deviation value) is added to the current control value. As the result, the continuity of the control can be maintained by providing a deviation from the current state constantly. And when the control value exceeds the control range of the voltage control oscillator 4, the maximum control value (e.g., 32767) or the minimum control value (e.g., −32767) is provided. In accordance with this control value, the frequency of the reference clock, which is the output of the voltage control oscillator 4, is updated. Program control thereafter returns to step 102, whereat the feedback control is again exercised.

If, at step 105, the difference between the PCR and the STC is greater than the limit value, it is assumed that a data stream that was newly received differs from the previous stream. When it is assumed that a different data stream has been received, the determiner 6 instructs the PCR extractor 1 to use the PCR that was extracted from the newly received data stream to set the counter 5, as the initial value for the STC (step 108). Further, the determiner 6 instructs the control value determiner 3 to employ, as an initial value, the frequency of the reference clock that is currently locked, instead of resetting the frequency to 27 MHz. Therefore, a control value with which the frequency currently output by the oscillator 4 is maintained is output by the control value determiner 3 (step 109). Program control thereafter returns to step 102, and the current reference clock is employed as a reference (this state is maintained until the next PCR is received) to initiate new transfer synchronization so as to eliminate the difference between the PCR and the STC. The feedback control is repeated, and the frequency of the reference clock is sequentially updated, in accordance with the differences obtained by the comparator 2, in order to synchronize data transfers between the transmission source and the decoder. So long as another device is not employed as the transmission source, it is expected that locking of the control will be effected faster by sequentially employing the current reference clock as an initial value than it will be by resetting the frequency to the initial value of 27 MHz, which is one of the system defaults.

According to the above described embodiment, since a process is employed according to which a data distribution device is seldom replaced once its employment has been determined (only a small change is made in the frequency of a reference clock originating at a data transmitter), based on a reference clock that has been locked, a control value for the voltage control oscillator is determined even when a differing data stream is received. Therefore, the continuity of the control value provided for the oscillator can be maintained. When short data streams, such as those for commercials, are sequentially received, a buffer overflow at a decoder can be prevented, and data loss during the data reproduction process can be eliminated.

In the above embodiment, the MPEG2 data stream has been explained. However, the present invention is not limited to the above embodiment, and can be applied for MPEG compatible data streams or other data streams that are encoded in the same manner.

According to the present invention, even when short data streams, such as those for commercials, are sequentially received, a buffer overflow at a decoder can be prevented, and the loss of reproduced data can also be eliminated.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A decoder comprising a feedback circuit including a comparator, a control value determination means, an oscillator and a counter for decoding an encoded data stream that is distributed across a network and that includes sync data originating at a transmission source, said decoder comprising:

an extraction circuit for extracting from a received data stream said sync data originating at said transmission source;

an oscillator for generating a reference clock used to decode data and for varying the frequency of said reference clock in accordance with a control value;

a counter for receiving said reference clock produced by said oscillator and for setting sync data for said decoder in accordance with said reference clock;

a comparator for acquiring a difference between said sync data originating at said transmission source and said sync data at said decoder;

control value determination means provided between said comparator and said oscillator for determining said control value in accordance with said acquired difference; and determination means for permitting, when said difference between said sync data originating at said transmission source and said sync data at said decoder is greater than a predetermined limit value, said control value determination means to employ as an initial value, the frequency of the reference clock that is currently locked to initiate new transfer synchronization.

2. The decoder according to claim 1, wherein said data stream is an MPEG compatible data stream.

* * * * *